United States Patent Office 3,499,865
Patented Mar. 10, 1970

3,499,865
METHOD OF MAKING A VULCANIZABLE RUBBER COMPOSITION WITH REACTION PRODUCTS OF SULFUR AND ORGANIC AMINES
Hans Bosch, Neuried, Germany, assignor to Chemische Werke Munchen, Otto Barlocher GmbH, Munich, Germany
No Drawing. Filed Sept. 23, 1966, Ser. No. 581,444
Claims priority, application Germany, Sept. 23, 1965, C 36,947
Int. Cl. C08c 11/18, 11/44, 11/50
U.S. Cl. 260—41.5          7 Claims

ABSTRACT OF THE DISCLOSURE

For making vulcanizable rubber compositions a separate reaction is set up between an organoamino compound, sulfur and a filler at a temperature between 120 and 140° C. and the thus-prepared separate reaction mixture is later added to the rubber composition.

---

The invention is directed to a new and particularly advantageous method for the vulcanization of rubber mixtures containing organic amino compounds, particularly those containing, in addition to sulfur and fillers, synthetic rubbers such as butadiene-styrene-copolymers, polybutadiene, polyisoprene or mixtures thereof.

The principal vulcanizing agent used, as known, is sulfur which is added to rubber mixtures during their production. In order to influence in a favorable manner the time consumption and the course of the vulcanization process (and also in order to obtain better properties of the end product) additional substances are added to the mixture in the production, such as certain nitrogen- and sulfur-containing organic compounds (vulcanization accelerators) and organic amino compounds (acceleration-activators).

In the known method directed to the manufacture of rubber mixtures which are to be vulcanized, it is contemplated that the sulfur, and the substances used to influence the vulcanization, such as the organic amino compounds, for example, are added separately and unchanged as such.

According to the method of the invention, as compared to the known procedure, considerably better mechanical values can be obtained for the vulcanized end products. This is achieved according to the invention in that the organic amino compounds are first reacted with a part or the total amount of sulfur destined for the rubber mixture at elevated temperature and in atmospheric oxygen, and this preliminary reaction mixture is then added, instead of the individual components, to the remaining rubber mixture and processed therewith.

Apart from an improvement of the values of the mechanical properties of the vulcanized end products, the spread of these values is also considerably reduced. The important mechanical properties include: tearing strength, breaking elongation, notch impact strength, hardness, abrasion, fatigue, aging.

Additionally, the process according to the invention also produces favorable effects on the vulcanization process itself. On the one hand, the vulcanization time is reduced, so that even the customary vulcanization accelerators can be eliminated in certain cases, while on the other hand, an extensive plateau is obtained in the course of various physical properties as a function of the vulcanization time.

The above-mentioned preliminary reaction of sulfur with organic amine compounds is preferably carried out in the presence of a part of the fillers used in the rubber mixture, which leads to the formation of a free-flowing powder. On the one hand, due to the large surface provided by the filler, the access to atmospheric oxygen is greatly facilitated, while on the other hand, the resulting reaction mixture is then present in the from of a powder which can be worked easily into the rubber mixture.

The method according to the invention will be described more fully in the following examples. First will briefly be described the production of six mixtures of sulfur and organic amines used in the examples. By "parts," as given hereafter, refers to parts by weight.

PRODUCTION OF REACTION MIXTURES OF SULFUR AND ORGANIC AMINES (I) In an open vessel there is added under stirring, one part of finely powdered sulfur to one part monoethanol amine, and the mixture thus obtained is heated with constant stirring to 120–125° C. The mixture is kept for 15 minutes at this temperature and is then allowed to cool while stirring.

(II) 3 parts highly dispersed precipitated silica are mixed in an open vessel with stirring with 1 part sulfur at room temperature. Thereafter, 1 part mineral oil is added under constant stirring and subsequently 1 part monoethanol amine is added. Sometimes an exothermic reaction occurs. The temperature of the mixture is kept constant by cooling or by additional heating for 15 minutes at 120–125° C. under constant stirring. Subsequently, the mixture is cooled to room temperature while stirring. A dry powder is obtained. The purpose of the addition of mineral oil is to reduce dusting.

(III) 3 parts silica, 1 part sulfur and 2 parts triethanol amine are used. The process is the same as described under II. After charging the triethanol amine, the mixture is heated under constant stirring for 15 minutes to 130–135° C., and then cooled under continuing stirring.

(IV) 5 parts silica, 2 parts sulfur, 3 parts triethanol amine are used. The procedure is the same as under II. The mixture is heated for 10 minutes to 130–135° C. and then allowed to cool.

(V) 2 parts carbon black, 1 part sulfur, 0.3 part diphenyl guanidine, 0.5 part triethanol amine are used. To the carbon black, contained in an open vessel, are added at room temperature first the sulfur, then the diphenyl guanidine. The triethanol amine is then added slowly under constant stirring and the mixture is heated for 10 minutes to 120–130° C. The powdered mixture is then cooled to room temperature under continued stirring.

(VI) In an open vessel there are mixed under stirring 7 parts silica and 9 parts triethanol amine, while 3 parts concentrated sulfuric acid (96%) are slowly added. After cooling the mixture to about 100° C., 1 part sulfur is added. After thorough mixing, the mixture is heated under continued stirring for 10 minutes to 135–140° C. and then allowed to cool.

These reaction mixtures, according to I to VI, were used in the production of rubber mixtures whose compositions are indicated in the following Examples 1 to 8. In these compositions, SBR denotes a cold-polymerized styrene-butadiene rubber. The number following SBR is a type designation, which is customary in the synthetic rubber industry.

The rubber mixtures listed in the following Examples 1 to 8 were produced, if "rolling" is indicated, on a laboratory rolling mill, 110 x 225, 2 rolls with friction 1:1.2. The roll temperature was kept at 80–85° C.

The size of the charge results from the indicated compositions, where 1 part equals 3 g.

The rubber was charged to the rolling mill, and after the sheet was formed, the filler was added and zinc oxide, if necessary.

In addition to the amounts of the constituents, the respective mixing times and temperatures are also indicated in Examples 1 to 8. The mixing time for the remaining constituents of the mixture, including homogenization, was 5 minutes in the laboratory rolling mill, unless indicated otherwise.

In the Examples 1 to 8 there is given under (a) and (a₁) and (a₂) respectively, the composition of the rubber mixture where a preliminary reaction mixture of sulfur amine according to I to VI was used. Under (b) there is given the composition of a reference mixture where amine and sulfur were added separately, corresponding to the customary procedure.

EXAMPLE 1

(a₁) The following mixture was prepared:

| | Parts |
|---|---|
| SBR 1500 | 100.0 |
| Kaolin | 55.0 |
| Zinc oxide | 5.0 |
| Precipitated silica | 4.5 |
| Mineral oil | 1.5 |

The mixture was then subjected to 6 minutes of rolling.

The following was then added to the rolled sheet:

| | Parts |
|---|---|
| Dibenzothiazyl (-mercaptobenzthiazol disulfide) | 0.8 |
| Preliminary reaction mixture according to I given hereinabove | 3.0 |

(a₂) The following mixture was prepared:

| | Parts |
|---|---|
| SBR 1500 | 100.0 |
| Kaolin | 55.0 |
| Zinc oxide | 5.0 |

The mixture was then subjected to 6 minutes of rolling.

The following was then added to the rolled sheet:

| | Parts |
|---|---|
| Dibenzothiazyl disulfide | 0.8 |
| Product according to II given hereinabove | 9.0 |

(b) The following mixture was prepared:

| | Parts |
|---|---|
| SBR 1500 | 100.0 |
| Kaolin | 55.0 |
| Zinc oxide | 5.0 |
| Precipitated silica | 4.5 |
| Mineral oil | 1.5 |

The mixture was then subjected to 6 minutes of rolling.

The following was then added to the rolled sheet:

| | Parts |
|---|---|
| Dibenzothiazyl disulfide | 0.8 |
| Monoethanolamine | 1.5 |
| Sulfur | 1.5 |

EXAMPLE 2

(a) The following mixture was prepared:

| | Parts |
|---|---|
| SBR 1502 | 100.0 |
| Precipitated silica | 45.0 |
| Preliminary reaction mixture III given hereinabove | 9.0 |

The mixture was then subjected to 14 minutes of rolling.

(b) The following mixture was prepared:

| | Parts |
|---|---|
| SBR 1502 | 100.0 |
| Precipitated silica | 49.5 |
| Triethanol amine | 3.0 |

The mixture was then subjected to 11 minutes of rolling.

1.5 parts of sulfur were then added to the rolled sheet and the sheet was then subjected to an additional 3 minutes of rolling.

EXAMPLE 3

(a) The following mixture was prepared:

| | Parts |
|---|---|
| SBR 1502 | 100.0 |
| Precipitated silica | 45.0 |
| Preliminary reaction mixture according to IV | 10.0 |

The mixture was then subjected to 14 minutes of rolling.

(b) The following mixture was prepared:

| | Parts |
|---|---|
| SBR 1502 | 100.0 |
| Precipitated silica | 50.0 |
| Triethanol amine | 4.0 |

The mixture was then subjected to 11 minutes of rolling.

2.0 parts of sulfur were then added to the rolled sheet and the sheet was then subjected to an additional 3 minutes of rolling.

EXAMPLE 4

(a) The following mixture was prepared:

| | Parts |
|---|---|
| SBR 1502 | 100.0 |
| Precipitated silica | 45.0 |
| Zinc oxide | 5.0 |

The above mixture was mixed for 3 minutes in Meillie laboratory kneader at a mixing temperature of 125° C., after which 10.0 parts of the preliminary reaction mixture IV given hereinabove was added.

(b) The following mixture was prepared:

| | Parts |
|---|---|
| SBR 1502 | 100.0 |
| Precipitated silica | 50.0 |
| Zinc oxide | 5.0 |

The above mixture was mixed for 3 minutes in Meillie laboratory kneader at a mixing temperature of 125° C., after which the following were added:

| | Parts |
|---|---|
| Triethanol amine | 3.0 |
| N-cyclohexyl-2-benzothiazylsulfanamide | 1.0 |
| Sulfur | 2.0 |

EXAMPLE 5

Steps (a) and (b) were performed as in Example 4, but the mixing time in the kneader was 6 minutes and the mixing temperature was 158° C. After cooling of the preliminary mixture for 5 minutes on the roll, the remaining additives were added.

EXAMPLE 6

(a) The following mixture was prepared:

| | Parts |
|---|---|
| SBR 1500 | 100.0 |
| Carbon black, type HAF | 50.0 |

The mixture was subjected to 10 minutes of rolling. The following was then added to the rolled sheet:

5.7 parts of the preliminary mixture V given hereinabove.

(b) The following mixture was prepared:

| | Parts |
|---|---|
| SBR 1500 | 100.0 |
| Carbon black, type HAF | 53.0 |

The mixture was subjected to 10 minutes of rolling. The following was then added to the rolled sheet:

| | Parts |
|---|---|
| Triethanol amine | 0.75 |
| Diphenyl guanidine | 0.45 |
| Sulfur | 1.5 |

EXAMPLE 7

(a) The following mixture was prepared:

| | Parts |
|---|---|
| SBR 1502 | 100.0 |
| Precipitated silica | 50.0 |
| Zinc oxide | 5.0 |

The mixture was then subjected to 11 minutes of rolling. The following was then added to the rolled sheet:

| | Parts |
|---|---|
| Preliminary mixture VI given hereinabove | 10.0 |
| Dibenzothiazyl disulfide | 3.0 |
| Sulfur | 1.0 |

The product was then subjected to 4 minutes of rolling.

(b) The following mixture was prepared:

| | Parts |
|---|---|
| SBR 1502 | 100.0 |
| Precipitated silica | 53.5 |
| Zinc oxide | 5.0 |
| Neutral triethanol aminosulfate | 6.0 |

The mixture was then subjected to 11 minutes of rolling.

The following was then added to the mixture:

| | Parts |
|---|---|
| Dibenzothiazyl disulfide | 2.0 |
| Sulfur | 1.5 |

The product was then subjected to 4 minutes of rolling.

EXAMPLE 8

The steps were the same as in Example 7(a) and 7(b) respectively, but after production of the mixture the same was homogenized for an additional 6 minutes in the rolling mill at 89° C.

The mixtures produced according to Examples 1 to 8 were all vulcanized at 158° C. In the following Table 2 are compiled the vulcanization times and various physical values of the vulcanizates. The physical values were determined according to ASTM or DIN specifications, as listed in Table 1.

TABLE 1

| Measuring quantity | Designation | Specification Used |
|---|---|---|
| Vulcanization time in min | Vt | |
| Mooney-Scorch time in min. at 121° C | Sct | ASTM D1646 |
| Tearing strength in kg./cm.² | Zf | ASTM D412 |
| Breaking elongation in percent | D | ASTM D412 |
| Notch impact strength in kg./cm. | K | ASTM D624 |
| Shore hardness | ShH | ASTM D676 |
| Elasticity in percent | E | DIN 53512 |

TABLE 2

| Example No.: | Sct (121°) min. | Vt, min. | Zf, kg./cm. | E, percent | K, kg./cm. | ShH | E, percent |
|---|---|---|---|---|---|---|---|
| 1a₁ | | 5 | 73 | 900 | | | |
| | | 10 | 92 | 1,020 | 9.3 | 56 | 51 |
| | | 20 | 84 | 980 | | | |
| 1a₂ | | 5 | 117 | 760 | | | |
| | | 10 | 138 | 720 | 12.1 | 58 | 52 |
| | | 20 | 147 | 700 | | | |
| 1b | | 5 | 40 | 910 | | | |
| | | 10 | 61 | 990 | 7.4 | 54 | 50 |
| | | 20 | 58 | 950 | | | |
| 2a | | 5 | 109 | 820 | | | |
| | | 10 | 155 | 840 | | | |
| | | 20 | 217 | 830 | | | |
| | | 30 | 234 | 815 | 54.2 | 75 | 28 |
| | | 40 | 257 | 800 | | | |
| | | 50 | 264 | 790 | | | |
| 2b | | 5 | | | | | |
| | | 10 | | | | | |
| | | 20 | 86 | 735 | | | |
| | | 30 | 132 | 720 | 30.2 | 60 | 26 |
| | | 40 | 126 | 570 | | | |
| | | 50 | 122 | 445 | | | |
| 3a | | 5 | 178 | 920 | | | |
| | | 10 | 210 | 890 | | | |
| | | 20 | 280 | 860 | | | |
| | | 30 | 312 | 870 | 59.8 | 81 | 30 |
| | | 40 | 324 | 840 | | | |
| | | 50 | 320 | 800 | | | |
| 3b | | 5 | | | | | |
| | | 10 | 72 | 700 | | | |
| | | 20 | 101 | 620 | | | |
| | | 30 | 128 | 600 | 32.1 | 62 | 25 |
| | | 40 | 134 | 560 | | | |
| | | 50 | 112 | 460 | | | |
| 4a | 11.7 | 5 | 299 | 685 | | | |
| | | 10 | 315 | 675 | | | |
| | | 20 | 329 | 670 | | | |
| | | 30 | 332 | 650 | 62.4 | 78 | 31 |
| | | 40 | 326 | 650 | | | |
| | | 50 | 328 | 650 | | | |
| 4b | 11.2 | 5 | 135 | 1,060 | | | |
| | | 10 | 166 | 680 | | | |
| | | 20 | 239 | 710 | | | |
| | | 30 | 260 | 750 | 44.0 | 65 | 28 |
| | | 40 | 268 | 735 | | | |
| | | 50 | 260 | 410 | | | |
| 5a | 12.1 | 5 | 294 | 690 | | | |
| | | 10 | 312 | 680 | | | |
| | | 20 | 324 | 675 | | | |
| | | 30 | 334 | 660 | 64.2 | 77 | 31 |
| | | 40 | 330 | 650 | | | |
| | | 50 | 326 | 655 | | | |
| 5b | 19.2 | 5 | 17 | 600 | | | |
| | | 10 | 142 | 905 | | | |
| | | 20 | 126 | 800 | | | |
| | | 30 | 250 | 720 | 46.2 | 62 | 25 |
| | | 40 | 244 | 680 | | | |
| | | 50 | 207 | 610 | | | |
| 6a | | 10 | 239 | 520 | | | |
| | | 20 | 264 | 500 | 81.7 | 61 | 32 |
| | | 40 | 282 | 480 | | | |
| 6b | | 10 | 128 | 470 | | | |
| | | 20 | 204 | 420 | 62.0 | 59 | 28 |
| | | 40 | 220 | 380 | | | |

TABLE 2.—Continued

| Example No.: | Set (121°) min. | Vt, min. | Zf, kg./cm.² | E, percent | K, kg./cm. | ShH | E, percent |
|---|---|---|---|---|---|---|---|
| 7a | 20.7 | 10 | 295 | 755 | | | |
|    |      | 20 | 309 | 745 | | | |
|    |      | 30 | 324 | 740 | 62.5 | 74 | 36 |
|    |      | 40 | 328 | 720 | | | |
|    |      | 50 | 328 | 720 | | | |
| 7b | 19.2 | 10 | 260 | 735 | | | |
|    |      | 20 | 276 | 720 | | | |
|    |      | 30 | 279 | 690 | 52.7 | 72 | 33 |
|    |      | 40 | 272 | 670 | | | |
|    |      | 50 | 265 | 650 | | | |
| 8a | 21.1 | 10 | 292 | 076 | | | |
|    |      | 20 | 315 | 745 | | | |
|    |      | 30 | 330 | 740 | 62.8 | 74 | 36 |
|    |      | 40 | 326 | 725 | | | |
|    |      | 50 | 324 | 720 | | | |
| 8b | 26.8 | 10 | 235 | 960 | | | |
|    |      | 20 | 254 | 900 | | | |
|    |      | 30 | 250 | 840 | 48.2 | 70 | 32 |
|    |      | 40 | 263 | 820 | | | |
|    |      | 50 | 248 | 780 | | | |

It can be seen from the table values in Example 1 that a better tearing strength and notch impact strength can definitely be achieved by the preliminary reaction of amine and sulfur, as was effected in 1($a_1$) and 1($a_2$) as compared to the separate addition of amine and sulfur, as in 1(b).

At the same time this example shows that a further improvement of the values of the physical properties is obtained if the preliminary reaction of amine and sulfur is effected in the presence of fillers.

The raising of the level of the physical values in the procedure according to the invention compared to the presently used procedure, appears also in all other examples, the improvement of the tearing strength and of the notch impact strength being particularly evident.

Furthermore, Example 3 shows that the good physical values obtained according to the procedure of the invention, as well as the vulcanization velocity (Mooney Scorch time) hardly vary as a function of the mixing temperature and also remain constant over constant vulcanization time.

On the other hand, the conventional procedure with the separate addition of sulfur and amine shows a great dependence of the physical values as well as of the vulcanization time on the mixing temperature, as it can be seen from the values given in Table 2 and, for example, 3b.

In Example 5 the mixing time was varied. It can be seen from the values in Example 5 that the physical values of the vulcanization depend in the conventional production (5b) to a great extent on the mixing time, which is not the case in the procedure according to the invention.

What is claimed is:

1. A method of making a vulcanizing agent for diene rubber compositions, comprising reacting an organoamino compound selected from the group consisting of alkanolamines, alkanolamino salts and diphenylguanidine, sulfur and a filler selected from the group consisting of carbon black and silica, the amino compound being present in an amount between 0.5 and 9 parts for each part by weight of sulfur and the filler being employed in an amount to provide the reaction product in the form of a free-flowing powder, the reaction being carried out at a temperature between 120 and 140° C. in the presence of atmospheric oxygen.

2. In the process of making a vulcanizable diene rubber composition which includes sulfur, a filler selected from the group consisting of carbon black and silica, and an organoamino compound selected from the group consisting of alkanolamines, alkanol-amino salts and diphenylguanidine, the step of separately reacting the amino compound with the sulfur and the filler, the amino compound being present in an amount between 0.5 and 9 parts for each part by weight of sulfur and the filler being present in an amount sufficient to provide the reaction product in the form of a free-flowing powder, the reaction being carried out at a temperature between 120 and 140° C. in the presence of atmospheric oxygen, whereupon the product of said reaction is added to the balance of the diene rubber composition for further processing therewith.

3. A method according to claim 2 wherein said reaction product is added to the balance of said rubber composition prior to rolling the entire mixture.

4. A method according to claim 2 wherein the rubber composition is a synthetic rubber polymer.

5. A method according to claim 1 wherein the reaction of the amino compound with the sulfur is effected at a temperature of 120° to 140° C. for 10 to 15 minutes while constantly stirring.

6. A method according to claim 1 wherein the reaction product of amino compound and sulfur is allowed to cool to room temperature while stirring.

7. A method according to claim 2 wherein said preliminary reaction mixture is added to the remaining rubber mixture after the latter has been rolled.

References Cited

UNITED STATES PATENTS

| 2,140,259 | 12/1938 | Clifford | 260—795 |
| 2,208,326 | 7/1940 | Lichty | 260—795 |
| 3,355,417 | 11/1967 | Martin | 260—41 |

OTHER REFERENCES

Chemical Abst., vol. 55 (1961), page 26,495(d) (B. L. Babitskii), from Kauchuk, Rezina.

JAMES A. SEIDLECK, Primary Examiner

C. A. HENDERSON, Jr., Assistant Examiner

U.S. Cl. X.R.

260—79.5, 789, 795, 798